United States Patent

[11] 3,601,801

[72] Inventor Jacques Louis Sauvan
Paris, France

[21] Appl. No. 789,709
[22] Filed Jan. 8, 1969
[45] Patented Aug. 24, 1971

[73] Assignee Societe Anonyme dite: Societe Nationale d'Etude et de Construction de Moteurs d'Aviation S.N.E.C.M.A.
Paris, France

[32] Priority Jan. 9, 1968
[33] France
[31] 135 311

[54] PARALLEL SIGNAL LOGIC COMPARISON CIRCUIT
8 Claims, 7 Drawing Figs.

[52] U.S. Cl. 340/146.2, 179/18 GF, 235/177, 340/166
[51] Int. Cl. G06f 7/00, G06f 7/02
[50] Field of Search 235/177; 340/172.5, 166, 146.2; 367/211; 179/18 GF

[56] References Cited

UNITED STATES PATENTS

| | | | |
|---|---|---|---|
| 3,031,650 | 4/1962 | Koerner | 340/146.2 UX |
| 3,136,977 | 6/1964 | Lamy et al. | 340/146.2 X |
| 3,251,035 | 5/1966 | Weinstein | 340/146.2 |
| 3,313,927 | 4/1967 | Raike et al. | 235/177 |
| 3,414,885 | 12/1968 | Muller | 340/146.2 X |

*Primary Examiner*—Malcolm A. Morrison
*Assistant Examiner*—James F. Gottman
*Attorney*—Flynn & Frishauf

ABSTRACT: A logic circuit to effect the comparison of a number $m$ of lines in a set of $n$ lines A and energized in any sequence with a number $q$ of energized lines in a set of $p$ lines B. A matrix has a series of $n$ inputs linked to the $n$ row lines and a series of $p$ inputs linked to $p$ column lines. At the nodes of the row and column lines, an AND gate is provided having an inverted output. The inverted output is connected to one input each of two AND gates each having another input supplied by the respective row or column line to provide an output from the row or column line at the nodal point if, and only if there is no coincidence of input. The row and column lines are connected to OR gates and to a comparator, energization of the row or column OR gate, respectively, indicating that the larger number of row or column lines was energized initially; if both OR gates are deenergized, the comparator will indicate equality of numbers of input lines energized.

Figure 1:
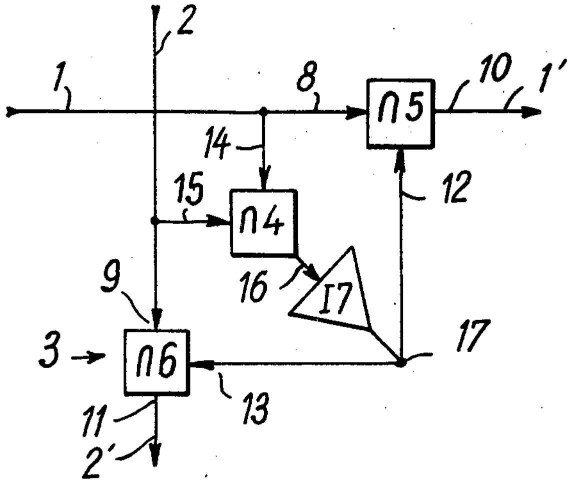

JACQUES L. SAUVAN,
Inventor
by Stephen H. Frishauf,
Atty

PARALLEL SIGNAL LOGIC COMPARISON CIRCUIT

The present invention relates to a logic circuit for the solution of problems, such as found in data processing, which require comparison of a number with another number one of which may be a number varying from comparison to comparison and representing threshold values.

There are already numerous known logic circuits for subtracting two numbers. In general, these numbers are expressed in a binary or decimal binary code and subtraction is then carried out bit by bit for bits of the same order.

In these circuits, the subtraction of two bits of the same order is carried out in a very simple manner by using inhibiting circuits. These circuits are placed at the junction of two lines, the state of which represents the value of the bits to be compared. If the two lines are energized by signals representing the logic level 1 then the inhibiting circuit inhibits both signals so that a signal representing a logic level 0 is provided at the output of the inhibiting circuit. On the other hand, if the states of these two lines are different, the inhibiting circuit does not inhibit the signals of these lines. Thus by analyzing the state of the outputs of the inhibiting circuit it is possible to determine the result of a subtraction of two bits: the result is 0 if the two outputs are simultaneously inhibited, which corresponds to 1 on the two inputs and the result is 1 or −1 according to which of the two outputs of the inhibiting circuit is energized.

It may further be said that if A represents the data carried by one of the lines and B the data carried by the other line, the two corresponding outputs of the inhibiting circuit supply, respectively, the logic functions $A.\overline{B}$. and $\overline{A}.B$.

Known devices used to compare two numbers expressed in binary code comprise, therefore, a first group of lines to which the successive bits of the first number are applied and a second group of lines to which the bits of the second number are applied. The lines to which are applied bits of the same order are connected to an inhibiting circuit which provides the preceding logic functions at its output. The comparison is carried out by successive subtraction of the bits of the same order in the two numbers with the provision for carrying forward the retained values.

This type of device not only allows comparison of two numbers to determine whether one number is larger or smaller than the other number but also makes it possible to calculate the difference between the numbers.

Apart from actual calculating operations, the problem of comparing two numbers arises very frequently when a decision has to be taken as exemplified in the comparison between one number and another, in which either may represent a threshold or predetermined value. Known devices make it possible to resolve problems of this nature when the numbers have previously been expressed in code.

However, there are cases where the number which is to be compared to another number such as a threshold value does not appear in a form which is easily coded. This happens in particular when the decision depends on the presence at a given moment of a number of elements such as conditions or objects which are likely to appear simultaneously originating from a larger set. The nature of the decision varies depending on this number being lower, equal or higher to the threshold value.

In practice, in order to stimulate this problem in data processing machines, a series of lines or circuit inputs is provided, each of which is applied to an element of the set; the presence of one of these elements at a given moment is simulated by a signal on the line which it is applied thereto. The problem is therefore reduced to comparing at this moment the number of energized lines to a threshold value.

With known circuits the comparing operation has been preceded by a counting process in order to count the energized lines involved; this counting operation is carried out in sequence and takes time. This loss of time is increased by the fact that comparison of the two numbers is then carried out bit by bit.

Two examples of this type of problem are given below:

In techniques which involve reading images or characters on photodiodes, one of the difficulties encountered consists in determining whether a given point should be considered as opaque or on the other hand as merely soiled. In the first case it is taken into account by the reading machine; in the second case it is rejected. One of the possible solutions is to project the elementary point of quantification of the image on a photodiode matrix. According to the number of photodiodes of this matrix which are to be affected it will be possible to decide whether a point should be retained or not. This number constitutes a threshold which may vary. The present solution to this problem involves sweeping successively the outputs of these photodiodes, counting those which are energized and comparing them with a reference number. Naturally, it would be much better to be able to ascertain the results of this comparison at the time of projection.

There are also processing problems in the operation of machine tools for which one available item of information is the number of machine tools of one and the same type. When resolving these problems it is necessary to know in each instance whether any machines are free in order to allocate to them the objects to be machined. It is also necessary to know whether the demand exceeds the number of machines available, and in such a case to arrange the available machines on a hierarchical basis. Under existing techniques, this can only be done by different countings followed by comparison. Naturally, it would be desirable for this problem to be solved at the time of appearance of the data in a quasi-instantaneous manner.

There are threshold gates or circuits which make it possible to compare instantly a number of energized lines taken from a larger set with a threshold number, but these circuits do not function by pure ON-OFF switching. It is therefore essential to represent the threshold number concerned to an analog value and to convert the input signals, upon their appearance to analog form in order to add them and then to compare the analog result obtained with the threshold value; the positive, negative or zero balance of this comparison is then used to supply a corresponding output signal.

This method of operation results in inaccuracies and errors, and adjustment of the components gives rise to considerable difficulties. It is difficult to obtain threshold gates providing reasonable reliability and the difficulty is greater according to the range of threshold adjustment which may be required.

It is an object of this invention to overcome these disadvantages and to provide a logic comparison circuit with an adjustable threshold possessing the advantages of accuracy and reliability of the circuits operating under binary conditions, that is, ON-OFF switching, preferably in parallel, or simultaneously at a given instant and with any given number of lines, whatever the sequence in which these lines, taken from a larger set, are energized.

SUBJECT MATTER OF THE INVENTION

Briefly, the comparison circuit of the present invention provides an output indication whether one set of lines has more energized lines in its set than another set of lines. The sequence of energization, counting lines from a start position, is immaterial. One set of lines is applied as row lines to a matrix, the other as the column lines to the matrix. Each nodal, or intersection point of a row and column lines has an AND gate, with two inputs, one each being connected to a row, or a column line respectively. The row and column lines are, additionally, connected through AND gates, having a second input which is derived from an inverted output from AND gate connected to the two row and column lines, respectively. Thus, output from the circuit at the nodal points will be obtained only if there is no coincidence of inputs at the two nodal lines and, conversely, passage of signals through AND gates in series with the nodal and column lines will be blocked if there is coincidence. The output from all the row and column line elements, which may be termed logic elements, are applied to OR gates. Energization of the one or the other OR gate, connected to the row or column conductors will be an indication that more conductors were energized in one, than in the other set of lines. The quality of energization can be determined by an additional gate.

The operation is such that, when it is desired to compare, with the aid of the circuit just described, a certain number $m$ of coexisting signals $q$ fixed in advance, $m$ line A inputs of this gate and $q$ line B inputs are energized. At each junction of a line A with line B simultaneously energized, the AND gates provided block the energizing of these lines above the junction point. In consequence, there will only appear at the output of the gate those signals—either of lines A or on lines B—which have not been inhibited.

If the number of inputs $m$ is greater than the number $q$ displayed, there will be found $m-q$ lines A still energized at one end of the matrix, and no line B output.

If $m$ is less than $q$, there will be found energized $q-m$ line B outputs and no line A outputs.

If $m=q$, no energized output will exist, either of line A or line B.

The circuit operates when the $n$ inputs thereof are connected to $n$ circuits although only a number $m$ have a signal applied, whatever the distribution of these $m$ signals among the $n$ circuits.

It is found, moreover, that it is simple to vary the number $q$ selected as a threshold value by varying the number of energized column inputs.

Thus, from the point of view of application, the matrix logic circuit defined above not only allows both comparison and subtraction of a whole number $m$ and of another whole $q$, but can also serve as a true threshold circuit for the control of one or several output circuits as a function of a number $m$ of any energized circuits taken from a set of $n$ circuits, the comparison being carried out in parallel, instantaneously.

The circuit also allows a separating function in that it can detect, in a case where the number $m$ is greater than the number $q$, which were the $m$ entry signals effectively inhibited and also, of course, which have passed through the matrix.

Figure 2:
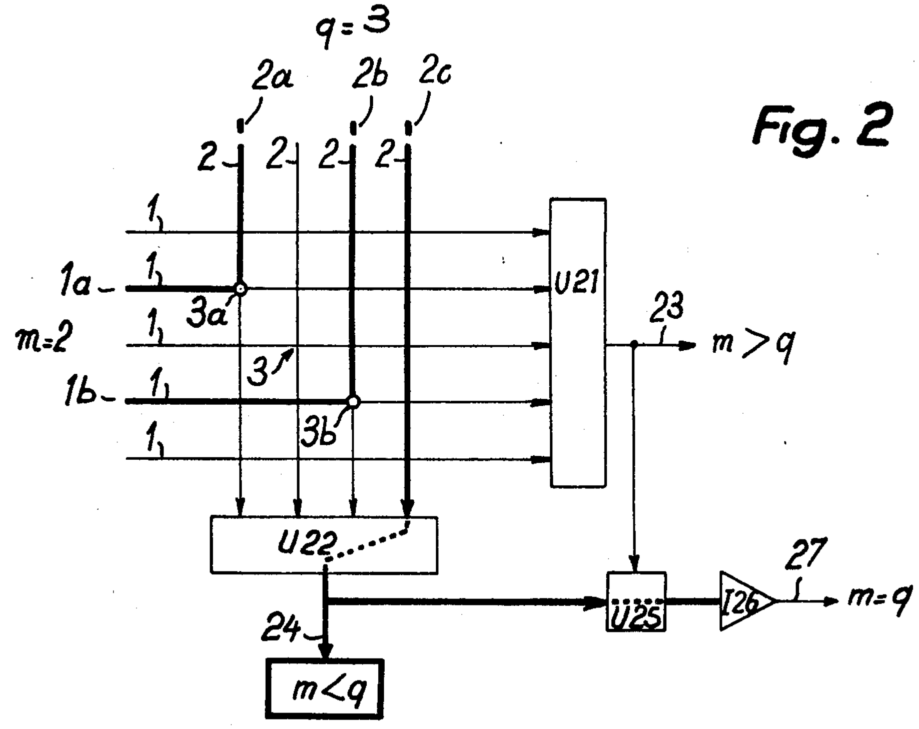
Figure 3:
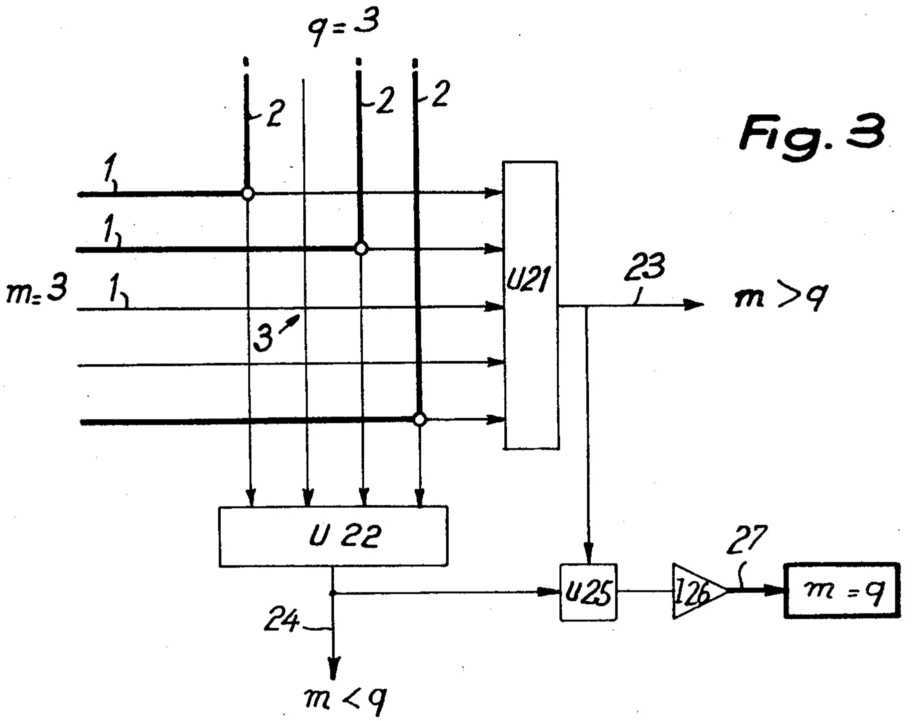
Figure 4:
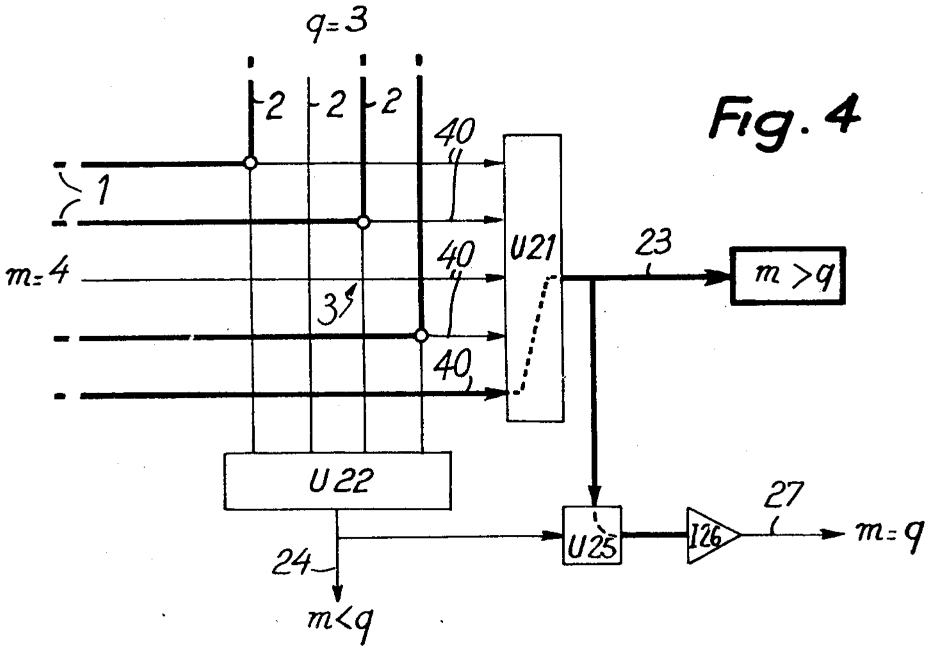
Figure 5:
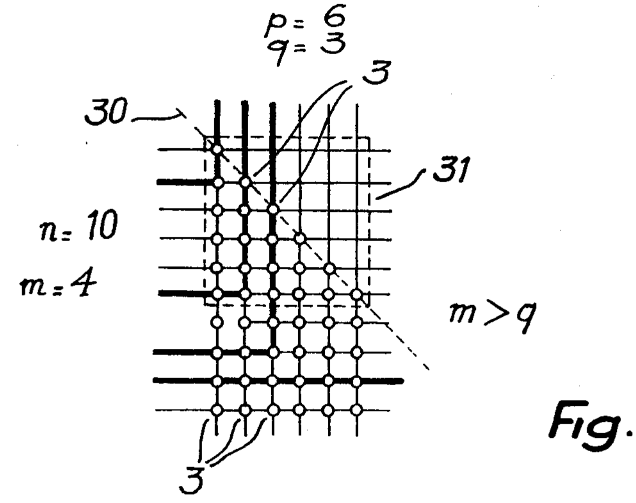

In the drawings:

FIG. 1 shows a logic diagram of an inhibiting circuit,

FIGS. 2, 3 and 4 illustrate three cases of functioning of a circuit according to the invention, depending on whether $m$ is greater than, equal to, or less than $q$, FIG. 5 illustrates a simplification of the construction of the gate shown in FIGS. 2, 3 and 4, and FIGS. 6 and 7 show two types of auxiliary logic circuits which allow a sorting function.

With reference to FIG. 1, a row circuit 1 and a column circuit 2 are capable of carrying signals in the direction indicated by arrows 1' and 2', and an inhibiting circuit 3 is connected at the junction of circuits 1 and 2. The components of this inhibiting circuit are three AND gates Ω4, Ω5 and Ω6 and an inverter I7. AND gates Ω5 and Ω6 are interposed in row 1 and column 2 respectively, in other words row 1 or column 2 constitute one of their inputs 8 and 9, and their outputs 10 and 11. Above these inputs 8 and 9, row 1 and column 2 are connected to the two inputs 14 and 15 of gate Ω4; the output 16 of this gate Ω4 is linked to the input of inverter I7, the output of which is itself connected to the other two inputs 12 and 13 respectively, of gate Ω5 and Ω6.

OPERATION

If row 1 and column 2 are energized simultaneously, gate Ω4 is conductive and delivers at its output 16 a signal to the inverter I7, which has the effect of inhibiting gates Ω5 and Ω6 by inputs 12 and 13. Since gate Ω5 and Ω6 are inhibited, row circuit 1 and column circuit 2 are deenergized.

On the other hand, if row 1 only is energized, gate 4 is inhibited and, consequently, over inverter I7, gate Ω5 is open and the signal passes. The same reasoning holds good if column 2 only is energized.

We will now consider the matrix of $n$ rows 1 and $p$ columns 2 with $(p<n)$, represented in FIGS. 2, 3 and 4 which contains, in each of its nodes, an inhibiting circuit 3 of the preceding type. All the outputs of rows 1 are connected to an OR gate U21 and all the outputs of the columns are connected to an OR gate U22. Furthermore, outputs 23 and 24 of OR gate U21 and U22 are connected to two inputs of an OR gate U25 followed by an inverter I26 the output of which is marked with the number 27.

The function illustrated with heavy lines on FIGS. 2, 3 and 4 to represent an energized circuit is as follows:

On FIG. 2, two inputs of rows $1_a$ and $1_b$ taken at random are energized. A threshold $q=3$ has been selected in the example by energizing three inputs of columns $2a$, $2b$ and $2c$, also selected at random; it will be seen that the inhibiting circuits $3a$ and $3b$ simultaneously intercept the signals $1_a$ and $2_a$ as well as the signals $1b$ and $2b$, so that only the signal from the input of column $2_c$ succeeds in crossing the matrix and reaches output 24 via OR gate U22, the output of which indicates that $m$ is less than $q$. The signal passing OR gate U25 is then blocked by inverter I26.

On FIG. 3, the number of energized row inputs is equal to the number of column inputs, that is, equal to three; it will be seen that no signal reaches OR gates U21 and U22. OR gate U25 will not be energized and inverter 26 will generate a signal on output 27 corresponding to the case where $m=q$.

Finally, as opposed to FIG. 2, FIG. 4 shows the case where, $m$ being greater than $q$, output 23 of the circuit is energized.

In certain applications of the circuit, it may happen that a random number $q$ is to be selected at circuits belonging to a set of $p$ circuits, without the energizing of these $q$ circuits being carried out in a sequence determined beforehand. In other cases it is possible to establish the system of selecting threshold $q$ in such a way that this threshold is effectively selected by energizing the $q$ column inputs of the matrix, first starting, for instance, from the left. This case is illustrated in FIG. 5; it will then be possible to eliminate all inhibiting circuits 3 situated to the right of diagonal 30 of square 31 of side $p$ shown by dotted lines on FIG. 5. An examination of FIG. 5 shows that the omitted circuits would never have been able to participate in this operation since all the signals from row 1 would be subject to interception by the inhibiting circuits situated to the left of diagonal 30. This arrangement leads to a saving of $(p^2-p/2)$ inhibiting circuits 3.

The circuit to be described may be used to carry out a separation of the row lines whose input signals have been inhibited after entering the circuit and of those whose signals have effectively crossed the gate in the case where $m>q$. It is possible to omit OR gate U21, and to collect, on the $n$ outputs 40 of FIG. 4, the $m-q$ signals which have crossed the matrix corresponding to $m-q$ inputs which exceeded the displayed threshold $q$.

Figure 6:
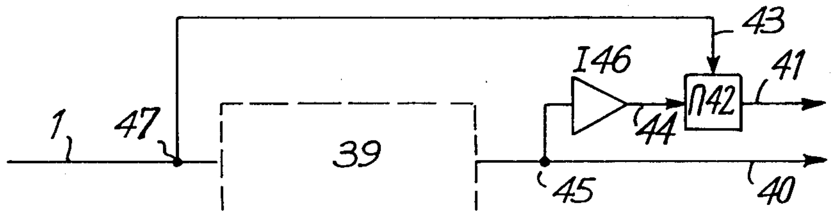
Figure 7:
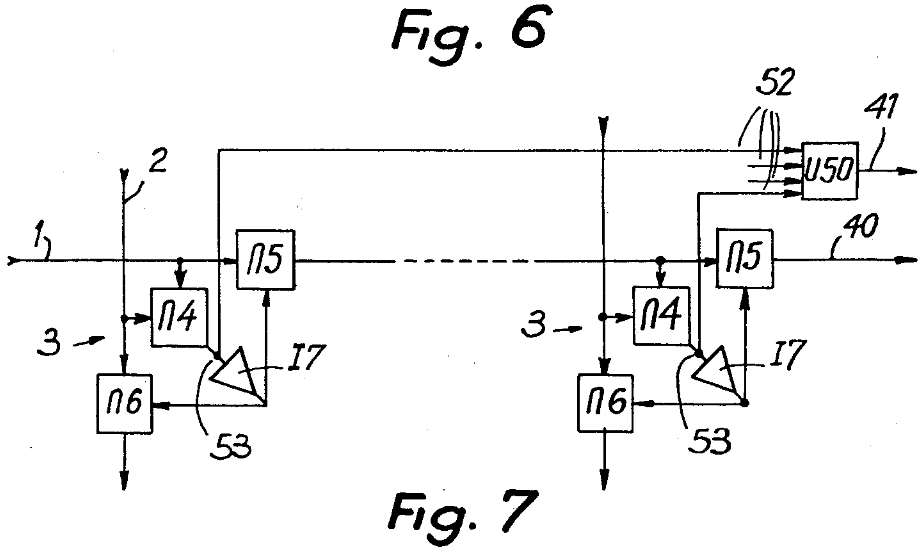

The device is then completed by providing $n$ other outputs 41 on which are made to appear signals corresponding to the $q$ first energized inputs whose signals have been inhibited within the matrix circuit. FIGS. 6 and 7 show two variants of logic circuits enabling this result to be achieved.

FIG. 6 represents a row line 1 crossing a matrix 39 and possessing an output 40; it has a second output 41 leading from an AND gate Ω42 with two inputs 43 and 44. The first input 43 is connected to line 1 at a point 47 located above matrix 39. The second input 44 is connected to a point 45 of line 40, located beyond the matrix 39, via an inverter I46. FIG. 6 shows that a signal will be available on output 41 if, and only if, the input of line 1 is energized and its output from matrix 39 is no longer energized. This means that a signal existed on input 1 and has been intercepted by an inhibiting circuit 3 inside matrix 39.

In the second variant, illustrated by FIG. 7, the output 41 is located beyond an OR gate U50 comprising $p$ inputs 52 each of these inputs 52 being connected at a point 53 of inhibiting circuits 3 at the intersections of the lines concerned. Point 53 is situated between the output of gate Ω4 and the input of inverter I7. At this point, a signal is provided only when the intersecting line and the column concerned are simultaneously energized, in other words, when the signal which energized the row line 1 in question exists but is then blocked by circuit 3. It will be sufficient for one of points 53 to be energized for output 41 to provide a signal indicating that the line 1 concerned was effectively energized at its input.

Thus, the two variants on FIGS. 6 and 7 lead to the same logic results, the choice of one or other solution depending on the technology used.

I claim:

1. Logic circuit to compare the number of energized lines $m$ in a first set of $n$ lines with the number of energized lines $q$ in a second set of $p$ lines in which the energization of specific lines in the sets is at random, and to obtain outputs indicative of: $m<a$; $m=q$ and $m>q$ said circuit comprising a matrix having the sets of lines forming, respectively row and column inputs to the matrix; decoding circuits (3) arranged at the nodal junction points of the row and column lines of the matrix, each nodal junction comprising a first AND gate (4) having one input each connected to a row line and a column line leading to the nodal point, and having an inverted (I7) output;

second and third AND gates (5, 6) one each associated with a row line ($n$) and a column line ($p$) respectively, each of said second and third AND gates having one input connected to the input side to the respective row or column line, and a second input connected to the inverted output from said first AND gate (4), to block outputs from the nodal points of row and column lines if there is coincidence of inputs to both row and column lines and to obtain output from the second and third AND gates (5, 6) only if there is noncoincidence of inputs to the row and column lines intersecting at the respective nodal point;

and means (U21, 22) determining if there is any output from any row or column lines of the matrix.

2. Circuit according to claim 1, wherein the output detection means (U21, 22) comprises a pair of OR gates (21, 22) each having all its input connected to all the outputs of the respective row and column lines, output from either OR gate associated with the row, or column lines, respectively, indicating that a larger number of lines of the respective row or column lines of the set of lines ($n$, $p$) is energized ($q>m$; $m>q$).

3. Circuit according to claim 2, including an additional OR gate (U25) having its inputs connected to the outputs of both said OR gates (U21, U22), absence of output from said additional OR gate (U25) being indicative (I26) of no input from said pair of OR gates (21, 22) and hence of the quality of number of energized lines in both said sets of row and column lines ($m=q$).

4. Circuit according to claim 1, wherein $np(p^2-p/2)$ decoding circuits are provided, in which $n$ and $p$ are, respectively, numbers of row and column lines, the matrix being divided by a diagonal (30) and all set decoding circuits are located at the nodal junction points of the row and column lines at one side of the diagonal, the remaining row and column nodal points not being interconnected, whereby a saving of $(p^2-p/2)$ decoding circuits in the matrix will result.

5. Circuit according to claim 4, wherein the diagonal line (30) starts at the matrix position $p=1$, $n=1$ and wherein the remaining decoding circuits are located at the side of the diagonal closest to the side of the $n$ input row lines.

6. Circuit according to claim 1, including additional logic circuit means (42, 46; 50) connected to the lines of at least one 46, these sets and being connected to indicate when the input to a respective line in the set is energized but the output of the corresponding line is blocked by said decoding circuits.

7. Circuit according to claim 6, wherein the additional logic circuit decoding means comprises an additional AND gate (42) associated with selected ones of the row and column lines (40) each additional AND gate (42) having one input (43) connected to the input row, or column line, respectively of the matrix and a second input (44) connected to an inverted (I46) output from the respective row or column line, output being indicative of the specific row, or column line which is energized at the input to the matrix but of which the output from the matrix is not energized.

8. Circuit according to claim 6, wherein said additional logic circuit decoding means comprises an additional Or gate (50) associated with a respective row or column, each, having its inputs connected to the noninverted outputs of the first AND gates (4) of the decoding circuits in any one row, output from any OR gate being indicative of concurrent input of the row and column lines to a nodal point in the respective line with which the additional OR gate is associated.